Sept. 7, 1943.  J. S. McMANUS  2,328,918
CROSSHEAD
Filed May 22, 1941  2 Sheets-Sheet 1
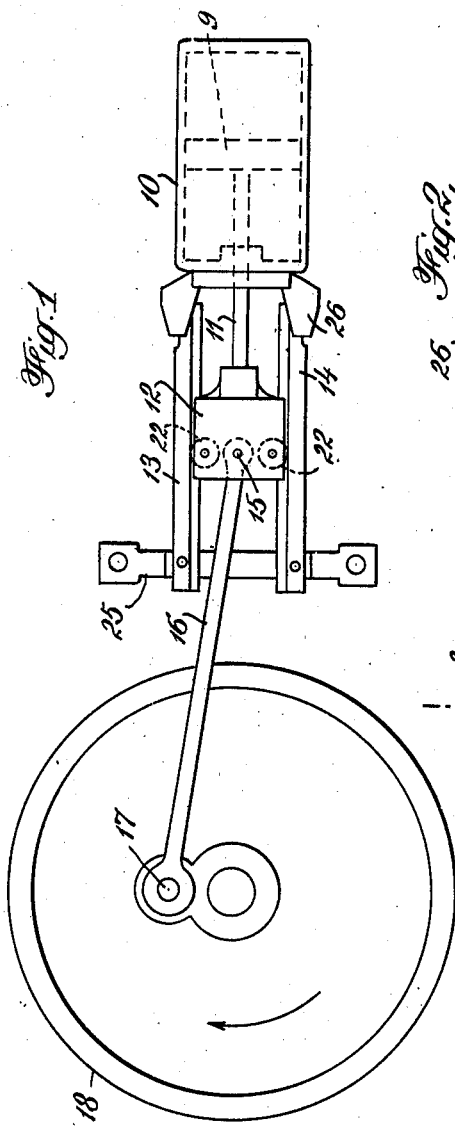
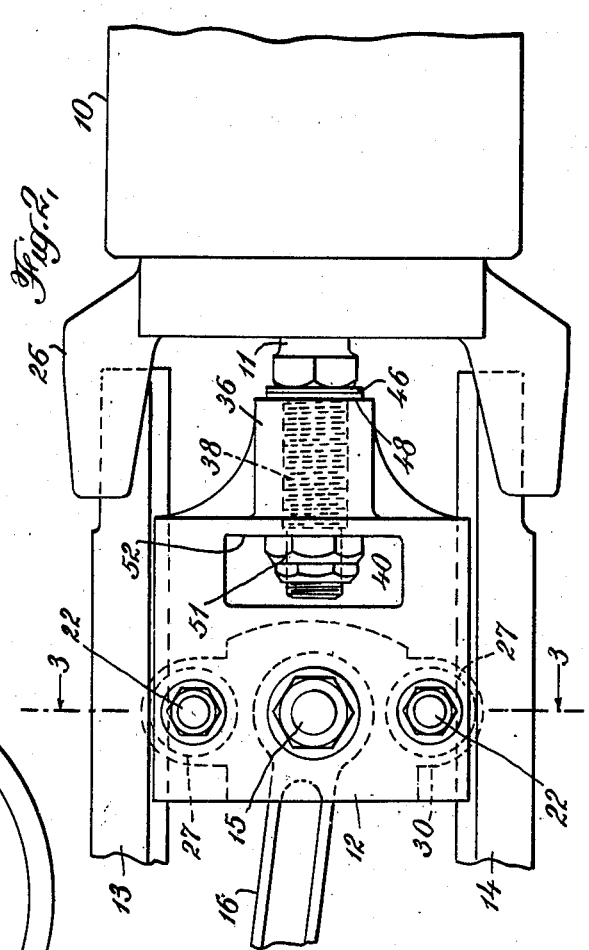
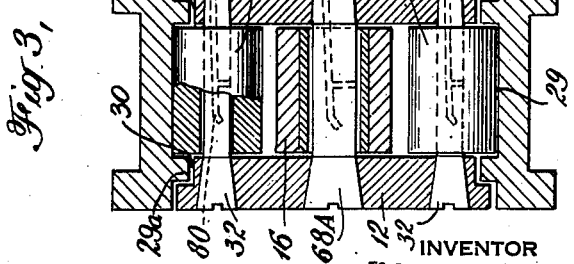
INVENTOR
JOSEPH S. McMANUS
BY
Pennie, Davis, Marvin & Edmonds
ATTORNEYS Sept. 7, 1943.    J. S. McMANUS    2,328,918
CROSSHEAD
Filed May 22, 1941    2 Sheets-Sheet 2
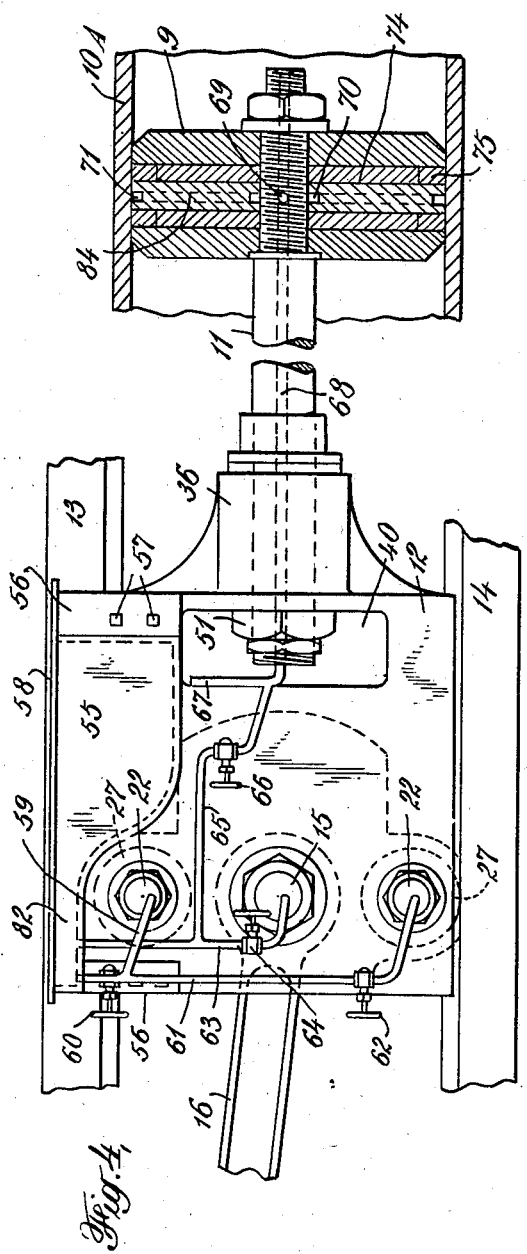
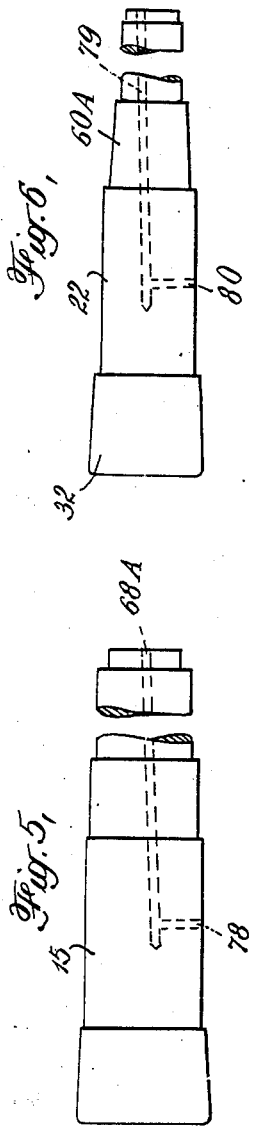
INVENTOR
JOSEPH S. McMANUS
BY
Pennie, Davis, Marvin & Edmonds
ATTORNEYS Patented Sept. 7, 1943

2,328,918

UNITED STATES PATENT OFFICE 2,328,918

CROSSHEAD

Joseph S. McManus, St. Thomas, Ontario, Canada

Application May 22, 1941, Serial No. 394,582
In Canada February 25, 1941

2 Claims. (Cl. 308—6)

My invention relates to crossheads.

In the form shown, the invention more particularly relates to a crosshead for locomotives.

As is known, the crosshead of a locomotive is slidably mounted between two superposed, parallel guides, and is rigidly connected to a piston rod from a cylinder piston. The crosshead is lined with a bearing metal. To a wrist pin on the crosshead is pivotally connected one end of a connecting rod, the other end of the rod being pivotally connected to the crank pin of a driving wheel of the locomotive. The crosshead is forced away from the cylinder on one stroke of the cylinder piston and is drawn back toward the cylinder on the other or return stroke of the piston. As the forces transmitted through the piston rod and through the connecting rod—whether in compression, on the outward stroke of the piston—are not in a same line during the greater part of one revolution of the driving wheel, the crosshead is subjected to a force tending to shift the crosshead toward one or the other of the guides. During the forward movement of the locomotive, the crosshead is urged toward and against the upper guide; during the rearward movement of the locomotive, the crosshead is urged toward and against the lower guide.

As the piston rod is rigidly connected to the crosshead, and the connecting rod is pivotally connected to the crosshead, the end of the crosshead remote from the piston rod is urged with greater force against the corresponding slide than the end next to the piston rod. This results in the uneven wearing of the crosshead lining, and on an unintended bending strain being imposed upon the piston rod, which in many cases, causes the rod to develop cracks and even to break down.

My invention provides a crosshead arrangement such that wear normally imposed upon the co-engaging parts, namely, crosshead and guides, will not result in the imposition of abnormal or unintended strain upon the piston rod. This is accomplished by a rigid connection between piston rod and crosshead, and by providing a one-point or localized bearing zone of the crosshead on its corresponding side, the bearing zones—that is, one on each side of the crosshead—preferably lying in a line drawn through the pivotal connection of the connecting rod with the crosshead at right angles to the two guides.

The objects of my invention are to provide:

(1) A crosshead that can be used with all locomotive valve gears;

(2) A crosshead without a crosshead arm;

(3) A crosshead that can be used on either side of a locomotive irrespective of the type of valve gear used;

(4) A crosshead having a one-point or localized bearing for each guide, one above and the other below the wrist pin in the crosshead;

(5) A crosshead having a one-point or localized bearing for each guide, but adapted to operate in the manner of the usual friction-lined crosshead, should the localized bearing become damaged or excessively worn.

(6) A crosshead particularly adapted to provide a rigid connection between crosshead and piston rod;

(7) A crosshead designed for a piston travel stroke adjusting lever;

(8) A crosshead which will result in economy of operation and upkeep, and will give generally better service.

Another object of the invention is to provide a very efficient lubrication system, such that the various parts subjected to most friction or wear are suitably lubricated.

In the drawings, wherein like numerals of reference indicate corresponding parts in the various figures, Figure 1 is a diagrammatic view of my invention;

Figure 2 is a fragmentary side elevation of a crosshead made in accordance with my invention, parts of the guides being broken off;

Figure 3 is a section on line 3—3 in Figure 2, with the lubricating system for the crosshead omitted;

Figure 4 is a view substantially similar to that shown in Figure 2, but showing the cylinder in part only and the piston in cross-section, and with the lubrication system of this invention installed;

Figure 5 is a fragmentary side elevation of the wrist pin;

Figure 6 is a fragmentary side elevation of one of the roller pins or screws.

Referring now by numerals to the drawings, 10 is a cylinder from the piston 9 of which extends a piston rod 11, the piston rod being suitably guided so as to move in the longitudinal axis of the cylinder. The rod projects through one end of the cylinder to be connected to a crosshead 12. The crosshead is slidably mounted between parallel guides, an upper guide 13 and a lower guide 14, suitably supported at one end by yokes 25 and at the other end by brackets 26 from the cylinder. The crosshead carries a wrist pin 15. A connecting rod 16 is pivotally connected between a crank pin 17 of a driving wheel 18 and the wrist pin 15. A reciprocating motion of the cylinder piston is thus translated into a rotary motion of the driving wheel.

My invention is primarily concerned with the bearing means between the cross head and the guides, and in order to improve the operation and efficiency of such bearing means, the connection between the piston rod and the cross head should be a rigid one. The bearing means of the present invention consists of two superposed but spaced bearings—preferably roller bearings—disposed in a straight line at right angles to the axis of the piston rod and carried by the crosshead so as to move bodily therewith; the axes of the roller bearings thus always assume the same position relatively to one another and relatively to the crosshead. Preferably, the axis of the wrist pin 15 lies in the longitudinal axis of the piston rod, and also lies in a straight line drawn between the axes of the roller bearings.

The crosshead is apertured laterally to receive machine screws 22 which rotatably support or journal sleeves or rollers 27, constituting the roller bearings aforesaid. The roller 27 is adapted to ride in a channel 29 formed in the guide and defined in part by longitudinally-extending ridges 29A spaced from the adjacent edges of the guide, the roller being accommodated or housed in a suitably formed recess 30 made in the crosshead. The side walls of the crosshead are formed with longitudinally-extending grooves 30A to loosely receive the ridges 29A of the guides. The roller projects beyond the crosshead so as to engage or ride in the channel 29 while the crosshead proper is free or clear of the guides. Should any of the screws 22 or the sleeve 27 journalled thereon break down, the crosshead will at least partially ride on one of the guides, the crosshead then operating to some extent as the usual shoe-type crosshead. The crosshead therefore is not subjected to any friction as by the guides. Preferably the bearings are positioned on a perpendicular centre line through the wrist pin bearing, as best shown on Figure 2.

As best shown in Figure 3, the screw 22 may be formed at one end with a tapered head 32, which is received into a similarly tapered or formed aperture in one wall of the crosshead; the part of the shank which traverses the other parallel wall of the crosshead, is preferably tapered as at 60A to facilitate the application and removal of the screw. The wrist pin 15 is formed substantially the same as the machine screw 22, its shank pivotally receiving the connecting rod 16.

As shown, the crosshead is formed with a reduced front portion 36 in the axis of which is a threaded bore 38 opening into a recess or cavity 40.

The rear end of the piston rod is threaded to engage in the threaded bore 38 of the crosshead. The piston rod is formed with a collar or shoulder 46 adjacent its reduced, threaded portion. A washer 48 or the like is applied to the threaded portion of the piston rod, to lie between the shoulder 46 and the end of the portion 36 of the crosshead, this washer serving as a shim to adjust the relative longitudinal position of the piston rod and crosshead.

The piston rod is attached to the crosshead by a suitable nut or nuts 51 threaded on the end of the rod against the vertical or rear face 52 of the recess. With the piston rod connected to the crosshead in the manner just described, a rigid connection is effected between rod and crosshead.

55 is an oil receptacle in the form of a hollow body, having end flanges 56 suitably secured, as with screws 57, to the outer face of the crosshead 12. The receptacle is closed by a suitable lid 58. The receptacle may be formed substantially as shown in Figure 4, having a reduced portion 82 at the rear end and extending above the upper pin or screw 22.

Each of the pins or screws 22 is provided with a channel 79, preferably slanted as shown in Figure 6, extending inwardly from one end and communicating with a channel 80 which opens out of the wall or periphery of the screw at a point within the length of the associated roller bearing 27. Similarly, the wrist pin 15 is provided with a channel 68A, preferably slanted as shown in Figure 5, extending inwardly to the pin and communicating with a channel 78 which emerges out of the pin at a point within the width of the connecting rod 16. Oil fed into the channels 79 and 68A of the pins 22 and the wrist pin 15, respectively, will gain access to the surface of the parts, respectively, which are to be lubricated.

Oil is fed to the wrist pin 15 by means of a small duct 63 operatively connected between the oil receptacle 55 and the end of the pin, there being preferably interposed a suitable valve 64 in the length of the duct, to thus control the flow of oil fed to the channel 68A of the pin. Similarly, oil is fed to the channels 79 of each of the upper and lower pins or screws 22, as by ducts 59 and 61, respectively, there also being preferably interposed suitable valves 60 and 62.

The piston rod 11 is provided with a longitudinal channel 68 into which oil is fed at one end by a duct 65 having preferably interposed in the length thereof a suitable valve 66. The piston 9 may include, as best shown in Figure 4, piston rings 75, between which is a disc 74 having a peripheral groove 71 which is in communication with a channel or recess 70 formed in the inner edge of the disc so as to be disposed around the piston rod, by means of a plurality of radially disposed channels 84. Connected with the channel 68 of the piston rod is a transversely disposed channel 69 which traverses the piston rod so as to communicate with the recess 70. Thus, oil from the channel 68 will be fed to the groove 71, and therefore to the inner surface of the sleeve 10A of the cylinder.

Preferably connected to the duct 65 is a duct or vent 67 extending to a point above the valve 66. This duct, which in effect is open to the atmosphere, and is in operative communication with the channel 68 and the groove 71 of the piston, will serve as an indicator, in that any leak in the piston ring arrangement will allow steam to escape into the channel 68 and force oil out of the open end of the duct 67.

In practice, the various valves (60, 62, 64, 66), will be so regulated or adjusted that the lubricating oil will be admitted into the various oil channels of the system which the valves control, drop by drop, and at a rate of so many drops per minute, as desired. The volume of oil within the receptacle 55 will be such that the reduced portion 82 will not be normally or at all times immersed or filled, but oil will be flushed to such reduced portion to drop therefrom into the ducts (59, 61, 63, 65) by the reciprocating motion of the crosshead.

I claim:

1. In a locomotive, a pair of rigid parallel guides having their adjacent faces formed with longitudinally extending ridges spaced from the side edges of said guides, a hollow crosshead adapted to move longitudinally of said guides, said crosshead including spaced walls formed with longitudinally extending grooves at their opposite inner edges to co-operate with said ridges in guiding said crosshead, a piston rod secured to said crosshead, and a rotary bearing journalled in said crosshead above and below the axis of said piston rod and riding on said guides between said ridges, said rotary bearings forming the sole bearing between said crosshead and said guides.

2. In a locomotive having a pair of parallel ridged guides and a piston rod reciprocable longitudinally of said guides; a crosshead rigidly connected to said piston rod, a wrist pin on said crosshead for pivotal connection with a connecting rod from a driving wheel, a single rotary bearing journalled in said crosshead above said wrist pin, and a single rotary bearing journalled in said crosshead below said wrist pin, said rotary bearings cooperating respectively with an adjacent guide to guide said crosshead longitudinally, the axes of said bearings and the axis of the wrist pin lying substantially in a common plane at right angles to said guides.

JOSEPH S. McMANUS.